United States Patent [19]

Inagawa et al.

[11] Patent Number: 5,553,041
[45] Date of Patent: Sep. 3, 1996

[54] DISC DATA REPRODUCING APPARATUS AND SIGNAL PROCESSING UNIT FOR PREVENTING UNDERFLOW AND OVERFLOW

[75] Inventors: Jun Inagawa; Masahide Nagumo; Kunihiko Kodama, all of Kanagawa-ken, Japan

[73] Assignee: Kabushiki Kaisha Toshiba, Kanagawa-ken, Japan

[21] Appl. No.: 419,272

[22] Filed: Apr. 10, 1995

Related U.S. Application Data

[63] Continuation of Ser. No. 159,601, Nov. 30, 1993, abandoned.

[30] Foreign Application Priority Data

Dec. 28, 1992 [JP] Japan ..................................... 4-359941

[51] Int. Cl.⁶ ..................................................... G11B 7/00
[52] U.S. Cl. .................. 369/48; 360/51; 369/50; 369/54; 369/124
[58] Field of Search ................................. 369/32, 47–48, 369/50, 54, 58, 111, 124, 59; 360/51, 78.04, 78.06, 78.08; 395/250 MS, 400 MS, 425 MS

[56] References Cited

U.S. PATENT DOCUMENTS

| | | | |
|---|---|---|---|
| 4,631,714 | 12/1986 | Kahlman et al. | 369/59 |
| 4,949,325 | 8/1990 | Tsuyoshi et al. | 369/47 X |
| 5,200,944 | 4/1993 | Souma | 369/48 |
| 5,220,545 | 6/1993 | Tomimitsu | 369/32 |
| 5,291,468 | 3/1994 | Carmon et al. | 369/47 |

FOREIGN PATENT DOCUMENTS

| | | |
|---|---|---|
| 0534883 | 3/1993 | European Pat. Off. . |
| 0546818 | 6/1993 | European Pat. Off. . |
| 38092231A1 | 10/1988 | Germany . |

*Primary Examiner*—W. R. Young
*Attorney, Agent, or Firm*—Finnegan, Henderson, Farabow, Garrett & Dunner, L.L.P.

[57] ABSTRACT

An apparatus, a signal processing circuit and a method for reproducing data stored on a disc to prevent a buffer memory from going overflow/underflow. Writing information data read from the disc to the buffer memory is performed in synchronism with a reproduction stage clock signal, and reading from the buffer memory is in synchronism with a signal processing stage clock. The signal processing stage clock for reading information data from the buffer memory is changed in accordance with the amount of information data stored in the buffer memory for preventing interruptions in data reproduction.

13 Claims, 8 Drawing Sheets

| SW | HS | UNDER | OVER | SELECTOR OUTPUT |
|---|---|---|---|---|
| L | L | X | X | C (NORMAL) |
| L | H | X | X | B (DOUBLE) |
| H | L | L | L | C (NORMAL) |
| H | L | H | L | D (HALF) |
| H | L | L | H | B (DOUBLE) |
| H | H | L | L | B (DOUBLE) |
| H | H | H | L | C (NORMAL) |
| H | H | L | H | A (QUADRUPLE) |

DISC DATA REPRODUCING APPARATUS AND SIGNAL PROCESSING UNIT FOR PREVENTING UNDERFLOW AND OVERFLOW

This application is a continuation of application Ser. No. 08/159,601, filed Nov. 30, 1993 now abandoned.

FIELD OF THE INVENTION

The present invention generally relates to an optical record disc player such as the compact disc player, its signal processing circuit and a method for data reproduction, and more particularly, to apparatus and method for reading out reproduced data from a buffer memory.

BACKGROUND OF THE INVENTION

As is well known in the field of audio equipment, digital record reproducing systems have been generally adopted for the purpose of reproducing recorded data of high density and high fidelity. In these systems, audio analog signals are converted into digitized data by a PCM(Pulse Code Modulation) technique and this data is recorded on a recording medium, such as a disc or a magnetic tape, to be reproduced. Among these systems, the compact disc is mainly used at present. In this case, a binary digit(bit) corresponding to the digitized data is formed on a disc of about 12 cm in diameter, and is optically read.

A reproducing device for reproducing the data recorded on the compact disc as described above, moves an optical pickup provided with a semiconductor laser and a photoelectric conversion device in a constant linear velocity tracking system(CLV) from the inner periphery side to the outer periphery side of the disc, and by rotating the compact disc the data recorded on the compact disc maybe read.

The data read out from the disc is supplied to an RF circuit. This RF circuit extracts, a focus error signal and tracking error signal from an output of the optical pickup, and supplies a servo control circuit with these extracted signals. The RF circuit also quantizes the signal read from the disc, and supplies a signal processing circuit with the quantized signal as an eight to fourteen bit modulated(EFM) signal. This signal processing circuit operates an EFM demodulation, a subcode demodulation and an error correction processing, then its output is supplied to a D/A(digital/analog) converter(hereinafter called DAC). An output of the DAC is supplied to a low pass filter(LPF), and an output of the LPF corresponds to a reproduced audio output signal. In a reproduction device used with a CD, in order to prevent a final audio output from causing wow and flutter, the EFM demodulated signal is stored in a buffer memory and read out after the error correction processing using a stable frequency clock signal. This clock signal is generally synchronous with a clock signal generated by a crystal oscillator.

Besides the well-known audio CD player, a CD-ROM player is also one of the reproducing apparatus using discs. The CD-ROM player reproduces two kinds of data co-existing on the disc, i.e. the audio signal and ROM data, such as image information and character codes. When the audio signal is read out, the reproduction is performed by a normal rate corresponding to audible information. On the other hand, when ROM data is read out, the reproduction is performed at a faster rate, such as a double rate. In such a CD-ROM player, frequent switching from the normal rate to the double rate or from the double rate to the normal rate are essential.

Figure 1:
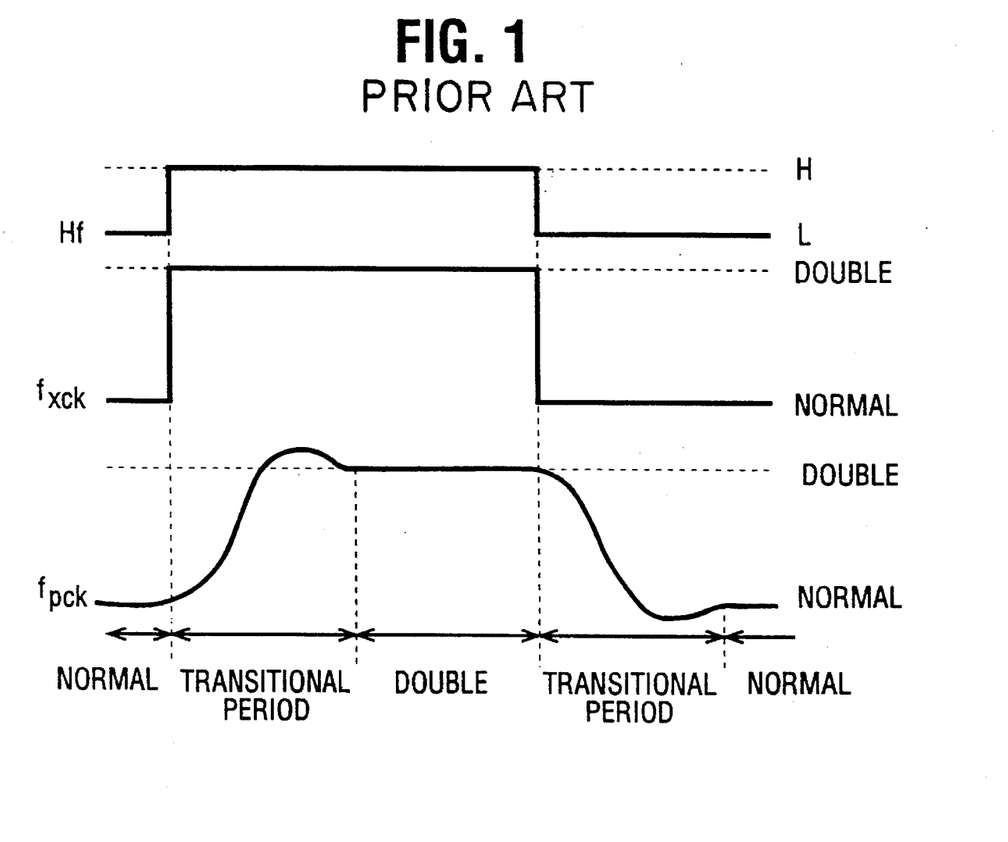
FIG. 1 is a timing chart-showing the relationship between the reproduction stage frame clock signal (PFS) and the signal processing stage frame clock signal(XFS) according to the conventional system.

As shown in FIG. 1, to change the reproduction rate, a rate control signal(HS) is used. When the signal HS is changed from "L" to "H", the rate is switched from the normal rate to the double rate, and when the signal HS is changed from "H" to "L", the rate is switched from the double rate to the normal rate. In such cases, the rotation speed of a disc motor does not change promptly but changes gradually from the normal rate to the double rate or from the double rate to the normal rate. As a result, a frequency of reproduction stage clock signal(PCK) generated by a PLL circuit in accordance with the rotation speed of the disc motor flutters frequently like the motor rotation.

On the other hand, a signal processing stage clock signal XCK) for the error correction processing and the audio output processing is switched promptly. As a result, within a transitional period of the disc motor until the rotation speed reaches the required speed, the frequency difference between the reproduction stage clock signal(PCK) and the signal processing stage clock signal(XCK) is relatively large.

In the buffer memory, storing(writing) is performed by a reproduction stage frame clock signal(PFS) synchronous with the signal PCK, and reading is performed by a signal processing stage frame clock signal(XFS) synchronous with the signal XCK. For this reason, the address difference between storing and reading caused by the frequency difference exceeds an allowed value for the buffer memory. This means an overflow or underflow i.e., emptying, which results in a reproduction interruption.

The problem mentioned above is not limited to the CD-ROM player. For example, the problem also exists for a CD player which comprises a shock proof memory to eliminate effects of the data pick-up interruption caused by a shock from outside. The shock proof memory, usually a large capacity memory such as 4 MB DRAM(four megabit dynamic random access memory), is employed between the buffer memory and the DAC to store the reproduced output of the buffer memory. The reproduced output is stored to the shock proof memory, then read out. This system is called shock proof.

In this system, storing to the shock proof memory is controlled to keep a predetermined data quantity in the shock proof memory in the following manner. When storing is interrupted by a shock from outside; the reproduced data in the shock proof memory is reduced because reading-out continues. If the quantity reduction in the shock proof memory is detected, then in order to recover the predetermined quantity in the shock proof memory, a reading rate from the buffer memory is switched to the faster rate. In this case, because the rotation speed of the disc motor changes gradually, the difference between the reproduction stage clock and the signal processing stage clock is increased. As a result, an underflow occurs in the buffer memory, which conducts the reproduction interruption.

As described above, in systems such as the shock proof memory and CD-ROM in which the reproduction rate is switched, the reproduction can be interrupted because of overflow or underflow.

Sudden speed change also occurs, by a search operation, in a conventional CD player which does not employ the reproduction rate switching. The disc rotates in about 8 Hz when the pickup is at the inner periphery side of the disc, and 3 Hz when the pickup is at the outer periphery side so as to maintain a constant linear velocity. For this reason, to track the data in the outer periphery side when the pickup is tracking the inner periphery side, the rotation speed of the disc motor should be reduced to below one-half. In the opposite case, when the pickup is at the outer periphery side, the speed should be increased to two times greater to track the data in the inner periphery side. The frequencies of the signals PCK and PFS obtained by supplying the RF circuit and the PLL circuit with the signal from the pickup, is synchronous with the disc rotation rate. For this reason, at the moment when the pickup moves to a target point, for example from the inner periphery side to the outer periphery side, the frequencies of the signals PCK and PFS are higher than their predetermined value for the target point until the disc motor decreases its speed to the predetermined speed. When the pickup moves from the outer periphery side to the inner periphery side, the frequencies of the signals PCK and PFS are lower than their predetermined value for the target point. These cases can result in underflow or overflow, by the frequency difference between the signals PFS and XFS, which results in the reproduction interruption. Particularly, in the system in which high-speed access is required, a long muting period until the reproduction is restarted is one of the serious problems.

To solve the above problems, although using high-controllability motors which have a shortened transitional period can be effective, these motors are expensive and result in an increased price of the CD player set.

SUMMARY OF THE INVENTION

Accordingly, it is one of the objects of the present invention to provide an improved disc player wherein reproduction interruptions, or muting caused by the reproduction speed switching are reduced.

It is a further object of the present invention to provide an improved signal processing circuit and a reproduction method for reducing interruptions of the reproduction caused by the reproduction speed switching.

In accordance with the present invention, the foregoing objects, among others, are achieved by providing an apparatus for reproducing information data stored on a disc comprising means for reading out information data from a rotating disc on which the information data is stored, means for generating a digitized signal by quantizing the read out information data in accordance with a rotation of the disc, means for generating a first clock signal synchronous with the digitized signal, means for demodulating the digitized signal in synchronism with the first clock signal and for outputting a demodulated data, means for storing the demodulated data, means for generating a second clock signal having a frequency controlled in accordance with an amount of data stored in the storing means, and means for controlling a writing operation to the storing means in synchronism with the first clock signal and for controlling a reading operation from the storing means in synchronism with the second clock signal.

In accordance with another aspect of the present invention, the above-stated objects are achieved by providing a signal processing circuit for use in processing information data read from a disc, comprising a first clock circuit to generate a first clock signal synchronous with a digitized signal generated by quantizing the information data in accordance with a rotation of the disc, a demodulator to demodulate the digitized signal in synchronism with the first clock signal and to output a demodulated data, a second clock circuit to generate a second clock signal derived from a constant clock signal, a buffer memory for storing the demodulated data, and a control circuit to control a writing operation to the buffer memory in accordance with the first clock signal and a reading operation from the buffer memory in accordance with the second clock signal, wherein a frequency of the second clock signal is controlled in accordance with an amount of data stored in the buffer memory.

A method for reproducing information data derived from the present invention comprising reading out information data from a rotating disc on which the information data is stored, generating a digitized signal by quantizing the information data in accordance with a rotation of the disc, generating a first clock signal synchronous with the digitized signal, demodulating the digitized signal in synchronism with the first clock signal and outputting demodulated data, generating a second clock, storing the demodulated data in synchronism with the first clock signal to a memory, reading the demodulated data stored in the memory means in synchronism with the second clock signal, and changing a frequency of the second clock signal in accordance with an amount of the demodulated data stored in the memory.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF PREFERRED EMBODIMENTS

Preferred embodiments of the present invention will be described in detail with reference to the drawings, i.e., FIGS. 2 through 10.

Figure 2:
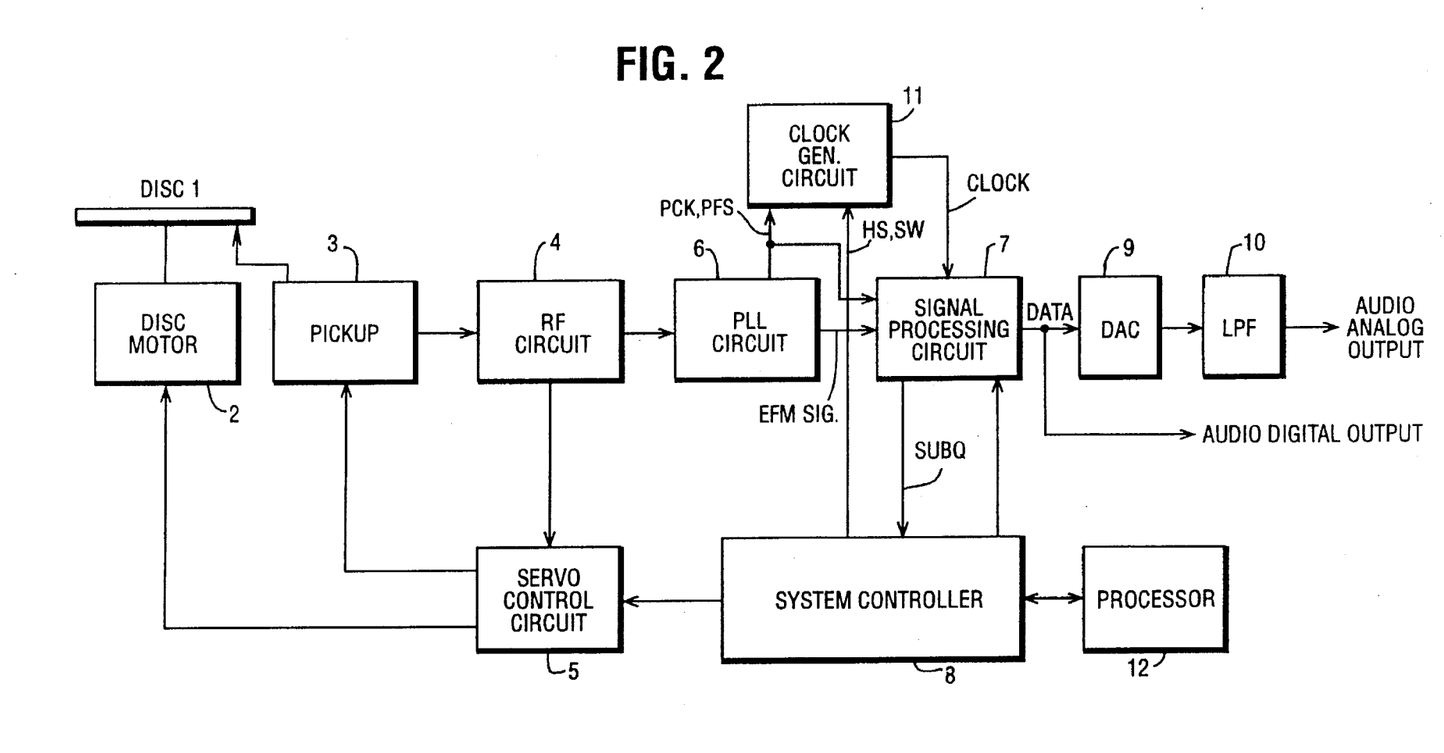
FIG. 2 is a block diagram of a disc data reproducing apparatus according to the present invention.

Referring now to FIGS. 2–5, an embodiment of the disc data reproducing apparatus for reducing reproduction interruptions will be described in detail. In FIG. 2, a disc 1 such as the CD(compact disc) is rotated by a disc motor 2. Recorded data on the disc 1 is read by an optical pickup 3, and the data read out is supplied to an EFM signal generation circuit(hereinafter called RF circuit) 4. The RF circuit 4 extracts a focus error signal and a tracking error signal from an output of the optical pickup 3, and supplies these extracted signals to a servo control circuit 5. Further, the RF circuit 4 quantizes the signal read from the disc 1 and supplies a PLL circuit 6 with the quantized signal as the EFM signal. The PLL circuit 6 generates a reproducing stage clock signal(PCK) synchronous with the EFM signal for demodulating the EFM signal in the following signal processing circuit 7. The PLL circuit 6 supplies the signal processing circuit 7 with the signal PCK and the EFM signal.

The servo control circuit 5 comprises a focus servo control circuit, a tracking servo circuit, a spindle servo control circuit and a sled servo control circuit. The focus servo control circuit controls an optical focus of the pickup 3 to make the focus error signal equal to zero. The tracking servo control circuit controls an optical tracking of the pickup 3 to make the tracking error signal equal to zero. The spindle servo control circuit controls a disc motor 2, such as a spindle motor, which drives the disc 1 at a predetermined speed. The sled servo control circuit, moves the pick up 3 to a target track point designated by a system controller 8. (These detailed components of the servo control circuit are not shown in the drawings.)

The signal processing circuit 7 performs an EFM demodulation, a subcode demodulation and an error correction processing. The output of circuit 7 is supplied to a D/A(digital/analog) converter(hereinafter called DAC) 9. An output of the DAC 9 is supplied to a low pass filter(LPF) 10, and an output of the LPF 10 corresponds to a reproduced audio output signal.

The system controller 8 supplies a clock generating circuit 11 with rate control signals including rate control signal(HS) and clock switching signal(SW). The system controller 8 also supplies the signal processing circuit 7 and the servo control circuit 5 with many other control signals for play, stop, search, attenuating, etc.

The system controller 8 generates the signal HS and the signal SW on the basis of control signals from a processor 12, which controls the whole system of the CD player. Information about the contents of the disc is obtained by reading TOC(Table of Contents) data on the disc. From TOC data, respective positions of the audio data and ROM data(such as image data and character codes) are obtained. The processor 12 controls the system controller 8 to generate the signal HS and the signal SW in accordance with the required(designated) data. When the designated data is the audio data, the signal SW of "L" level is generated to prevent the signal processing stage clock signal from being switched. On the other hand, when the designated signal is the ROM data, the signal SW of "H" level is generated.

The signal processing circuit 7 will be described in detail with reference to FIG. 3. The signal processing circuit 7 of this embodiment comprises an EFM demodulating circuit 21, a buffer memory 22, an error connection circuit 23, a subcode demodulating circuit 24, an output circuit 25 and a memory control circuit 28. The EFM demodulating circuit 21 receives the reproducing stage clock signal(PCK) which is generated by the PLL circuit 6 and is synchronous with the EFM signal. After extracting a synchronous signal, the EFM signal is demodulated and stored into the buffer memory 22 as 33-symbol data, per one frame, which consists of 1-symbol subcode data and 32-symbol main data including parity data.

The buffer memory 22 is used for jitter absorption and an interleaving in the error correction process. The jitter on the time axis is absorbed, or eliminated by writing the EFM demodulated signal to the buffer memory 22 in synchronism with the reproduction stage clock signal and by reading in synchronism with the signal processing stage clock signal which is generated from an accurate clock such as a crystal-oscillator clock. An output of the buffer memory 22 is supplied to the error correction circuit 23, in which C1 and C2 system error correction are performed. The error corrected data is again stored to the buffer memory 22. Subsequently, the error corrected data is read from the buffer memory 22, and supplied to the output circuit 25. The output circuit 25 outputs reproduced data(DATA) after, if uncorrectable data exists, mean value interpolation and mute functions are performed. The subcode demodulating circuit 24 reads out subcode data from the buffer memory 22, performs an error check of Q data(one component of the subcode), and outputs the result(SUBQ) to the system controller 8.

The memory control circuit 26 outputs an address signal, a chip enable signal(CE) and a read/write signal(R/W) to the buffer memory 22. In this case, the address to be supplied to the buffer memory 22 is classified into one of the following four kinds. These addresses are a Wr address for writing the demodulated EFM data in the buffer memory 22, a C1 address for reading C1 system data to detect an error of C1 system from the data written in the buffer memory 22 and for writing in and reading from the buffer memory 22 to correct the detected erroneous data, a C2 address for reading C2 system data to detect an error of C2 system from the data written in the buffer memory 22 and for writing in and reading from the buffer memory 22 to correct the detected erroneous data, and an Re address for reading the data from the buffer memory 22 to output to the DAC 9.

The memory control circuit 28 has an address circuit(not shown in the drawings) including counters. One of the counters counts up the reproducing stage frame clock(PFS) generated on the basis of the frame synchronizing signal of the EFM data read from the disc 1, and generates the frame address of Wr. As a result, jitter occurs during the writing-in processing of the demodulated EFM data into the buffer memory. Other counters count the signal processing stage frame clock signal(XFS), and generate the frame address of C1, C2, and Re. As described above, while writing of the demodulated EFM data is performed using Wr address in synchronism with the signal PFS, the reading is performed using the Re address in synchronism with the signal XFS. Therefore, jitter is absorbed. In FIG. 3, while detailed circuit configuration on a semiconductor chip is not shown, all elements of the signal processing circuit 7 may be formed on one semiconductor chip.

Figure 4:
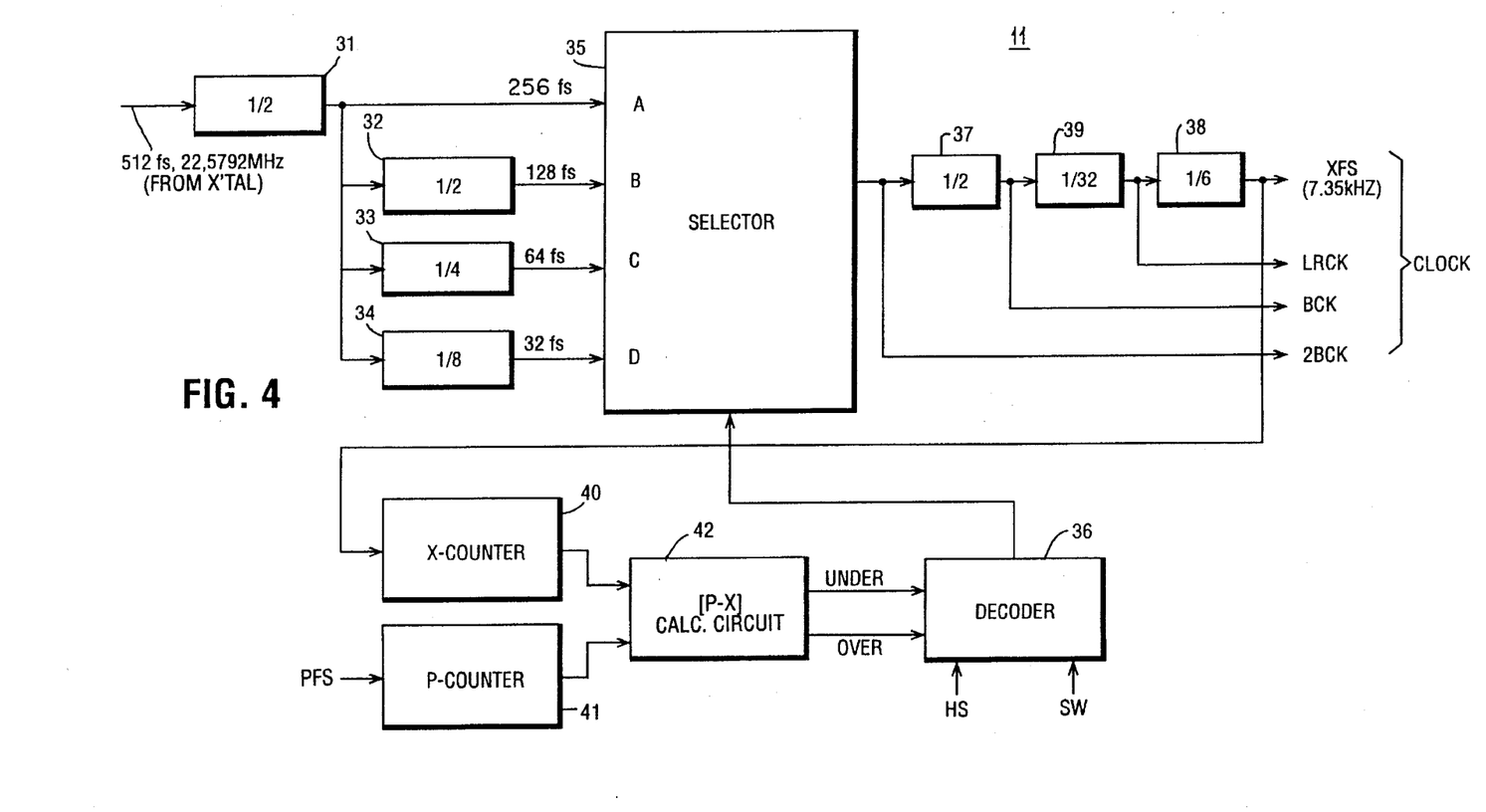
FIG. 4 is a block diagram of a clock generating circuit of a first aspect according to the present invention.

FIG. 4 is a block diagram showing the clock generating circuit 11 in detail. When a sampling frequency is 44.1 kHz, the frequency of 22.5972 MHz clock(512 fs) generated by a crystal oscillator(X' tal) is used. Through a divide-by-2 circuit 31, a 512 fs clock is supplied to a divide-by-2 circuit 32, a divide-by-4 circuit 33 and a divide-by-8 circuit 34. Outputs of each dividing circuits, i.e., a 256 fs clock, a 128 fs clock, a 64 fs clock and a 32 fs clock are supplied to A-input, B-input, C-input and D-input of a selector 35, respectively. In accordance with a control signal from a decoder circuit 36, the selector 35 outputs one of the inputs as a signal 2BCK. A bit clock signal(BCK) is obtained by supplying a divide-by-2 circuit 37 with the signal 2BCK. Furthermore, the signal BCK is supplied to a divide-by-6 circuit 38, through a divide-by-32 circuit 39, to obtain a channel clock LRCK and the signal processing stage frame clock XFS. LRCK and XFS have values of 44.1 kHz and 7.35 kHz, respectively, as the normal reproducing rate, when selector 35 selects the C-input. The signal XFS is supplied to an X-counter circuit 40. The signal PFS generated by the PLL circuit 6 is supplied to a P-Counter circuit 41. Outputs of each of the counter circuits 40 and 41 are received by a [P-X] calculating (subtraction) circuit 42.

The output of the P-counter 41 may be used as the writing frame address to the buffer memory 22, and the output of the X-counter may be used as the reading-out frame address for the buffer memory 22. For example, if a required jitter absorption ability of the buffer memory 22 is ±6 frames, then the writing frame address(P-counter value) is greater than the reading-out frame address(X-counter value) by 7 frames. Each counter counts up one unit-for every one frame.

The [P-X] calculating circuit 42 subtracts the value of the X-counter 40 from the value of the P-counter 41. On one hand, when the rotation speed of the disc motor 2 is slower than its required speed, the P-counter 41 counts up slower than the X-counter 40, and the value [P-X] reduces. On the other hand, when the rotation speed of the disc motor 2 is faster than its required speed, the P-counter 41 counts up faster than the X-counter 40, and the value [P-X] is increased. In the former case, for example [P-X] is smaller than four frames, the [P-X] calculating circuit 42 supplies the decoder 38 with a signal UNDER. In the latter case, for example [P-X] is grater than 12, the circuit 42 supplies the decoder 38 with a signal OVER.

Figure 5:
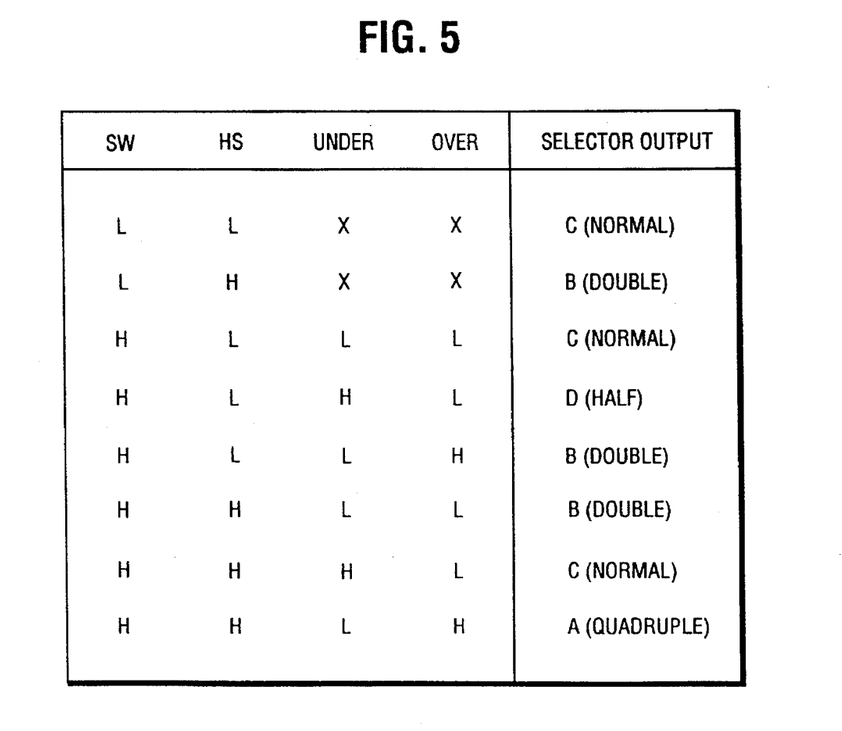
FIG. 5 is a chart representing the relationship between control signals and the output of a selector according to the present invention.

The decoder circuit 36 receives signals UNDER and OVER from the [P-X] calculating circuit 42, and receives the reproducing rate control signal(HS) and the clock switching signal(SW) from the system controller 8. In FIG. 5, the relationship between these signals and the output of the selector 35 is shown.

When the signal SW is "H"(high level), the signal processing stage clock(XCK) is switched in accordance with both the value [P-X] and the signal HS. When the signal SW is "L"(low level), the signal XCK is switched only by the signal HS. The signal HS represents the reproduction rate, "H"(high level) corresponds the double rate reproduction and "L"(low level) corresponds the normal rate. "X" in signals UNDER or OVER means "don't care"

Figure 6:
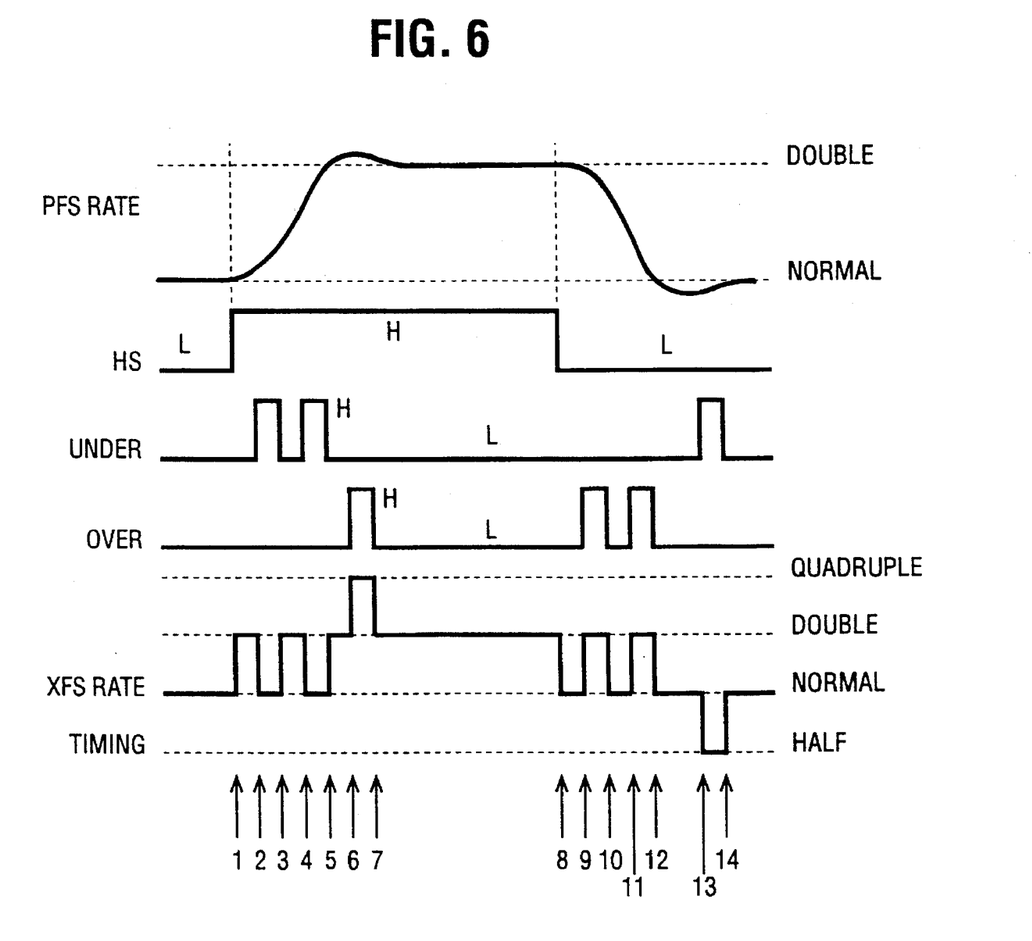
FIG. 6 is a timing chart representing the relationship between the reproduction stage frame clock signal(PFS) and the signal processing stage frame clock signal(XFS) according to the present invention.

Next, referring to FIG. 6, the operation in the case the signal SW represents "H" is explained in detail. At the timing 1, the signal HS is switched from "L" to "H", the signal XFS changes from the normal rate to the double rate promptly. The signal PFS changes from the normal to the double gradually.

At the timing 2 reduction in the value [P-X] occurs, the signal UNDER changes from "L" to "H", and the signal XFS changes from the double to the normal.

At the timing 3, the signal UNDER changes from "H" to "L", and the signal XFS changes to the double again.

At the timings 4 and 5, the operation is the same as at timing 2 and 3, respectively.

At the timing 6, the rotation speed of the disc motor 2 goes over the required speed for the double rate temporarily, and the signal PFS also goes over the required frequency for the double rate. As a result, the value [P-X] increases, the signal OVER changes to "H", and the signal XFS changes from the double rate to quadruple rate.

At the timing 7, the signal OVER changes to "L", and the signal XFS changes to the double. During the timing 7–8, the disc motor 2 rotates steadily at the double rate.

At the timing 8, the signal HS is switched from "H" to "L". By this switching, the signal XFS changes from the double to the normal, and PFS changes gradually.

At the timing 9, an increase in the value [P-X] occurs, the signal OVER changes from "L" to "H", and the signal XFS changes from the normal to the double.

At the timing 10, the signal OVER changes from "H" to "L", and the signal XFS changes to the normal again.

At the timings 11 and 12, the operation is the same as at timings 9 and 10, respectively.

At the timing 13, the rotation speed of the disc motor 2 goes under required speed for the normal rate, and the signal PFS also goes under the required frequency for the normal rate. As a result, the value [P-X] decreases, the signal UNDER changes to "H", and the signal XFS changes from the normal rate to the half rate.

At the timing 14, the signal UNDER changes to "L" and the signal XFS changes to the normal rate.

As described above, by changing the speed of reading-out from the buffer memory 22 in accordance with the rotation speed of the disc motor, the underflow and the overflow are prevented. Therefore, according to this embodiment of the present invention, the interruption of the data reproduction is reduced, and the reproduction data is available before the disc motor represents the required speed. Thus the present invention is effective for a reproduction system, such as the shock proof system and CD-ROM system, in which the reproduction rate is switched.

Figure 3:
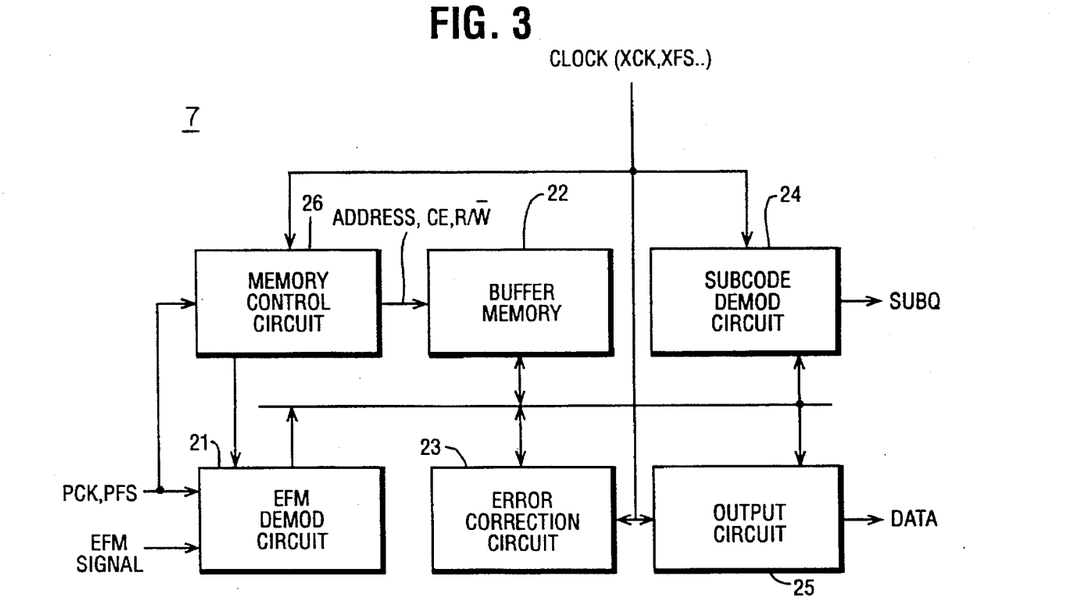
FIG. 3 is a block diagram of a signal processing circuit of an aspect according to the present invention.

In the embodiment described above, the present invention is applied to the data reproduction apparatus with the signal processing circuit shown in FIG. 3. In this data reproduction apparatus, the subcode data is synchronized with the signal processing stage clock, so that the subcode data is always synchronous with the reproduction data. Stories and reading out the demodulated EFM data to/from the buffer memory in units of single subcode blocks, the reproduction data is obtained continuously.

Now, another embodiment of the present invention will be described. The present invention as applied to data reproduction apparatus can be practiced with a signal processing circuit shown in FIG. 7.

Figure 7:
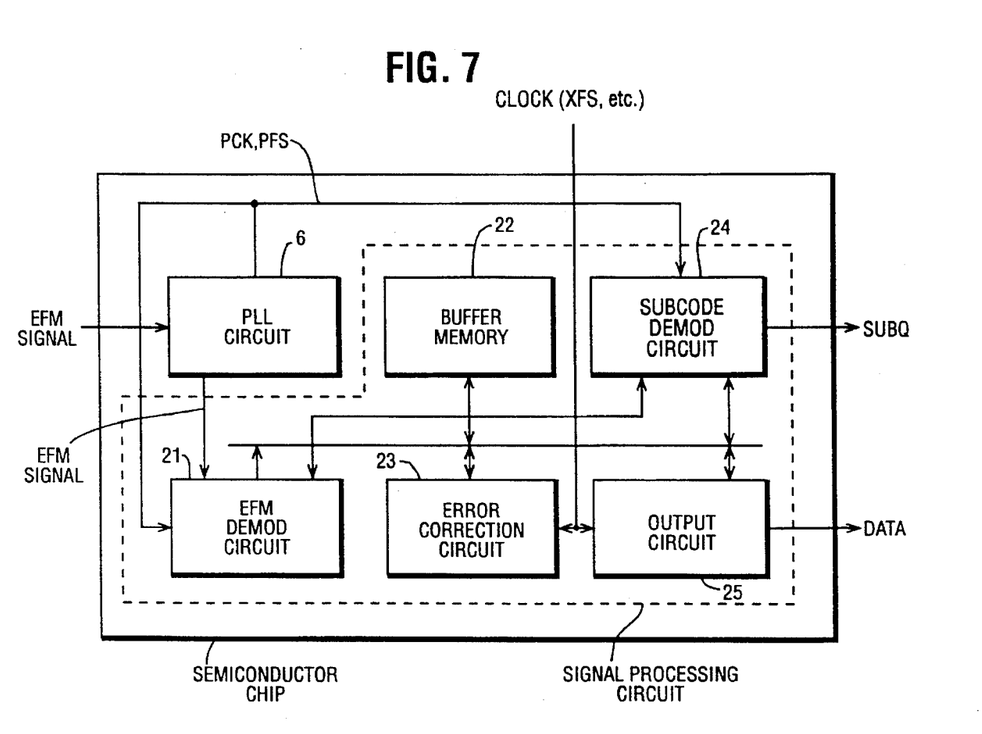
FIG. 7 is a block diagram of a signal processing circuit of another aspect according to the present invention.

In the signal processing circuit shown in FIG. 7, the reproduction stage clock signal(PCK), which is synchronous with the EFM signal and is for demodulating the EFM signal, is generated by the PLL circuit 6. The reproduction stage clock signal(PCK) is supplied to the EFM demodulating circuit 21 and the subcode demodulating circuit 24. Providing the subcode data in the demodulated EFM signal to the subcode demodulating circuit 24, the subcode is demodulated and is output as SUBQ to the system controller 8.

Because the reproduction stage clock is supplied to the subcode demodulating circuit 24, the demodulated subcode data(SUBQ) is output in synchronism with the reproduction stage clock. For this reason, the jitter, or difference, between the demodulated subcode data(SUBQ) and the reproduction data synchronous with the signal processing stage clock-(XCK) is generated. In this manner, the present invention can be applied to this type of signal processing circuit shown in FIG. 7.

As shown in FIG. 7, the signal processing circuit 7 may be formed on one semiconductor chip with the PLL circuit 6. The clock generating circuit 11, the servo control circuit 5 and system controller 8 also may be formed on the same semiconductor chip. In FIG. 7, the memory control circuit 26 (FIG. 3) is not shown, but may be formed on the same semiconductor chip.

Next, referring FIGS. 8 and 9, a clock generating circuit for low power consumption will be described.

In the clock generating circuit 11 shown in FIG. 4, dividing circuits are always operating for supplying divided clock signals after the reproduction rate switching. When the disc motor is in the stable operation, changing the signal processing stage clock, or changing reading-out clock fop buffer memory is not needed. Thus, by activating the dividing circuit after the reproduction rate control signal(HS) is changed, a circuit with low power consumption is provided.

Figure 8:
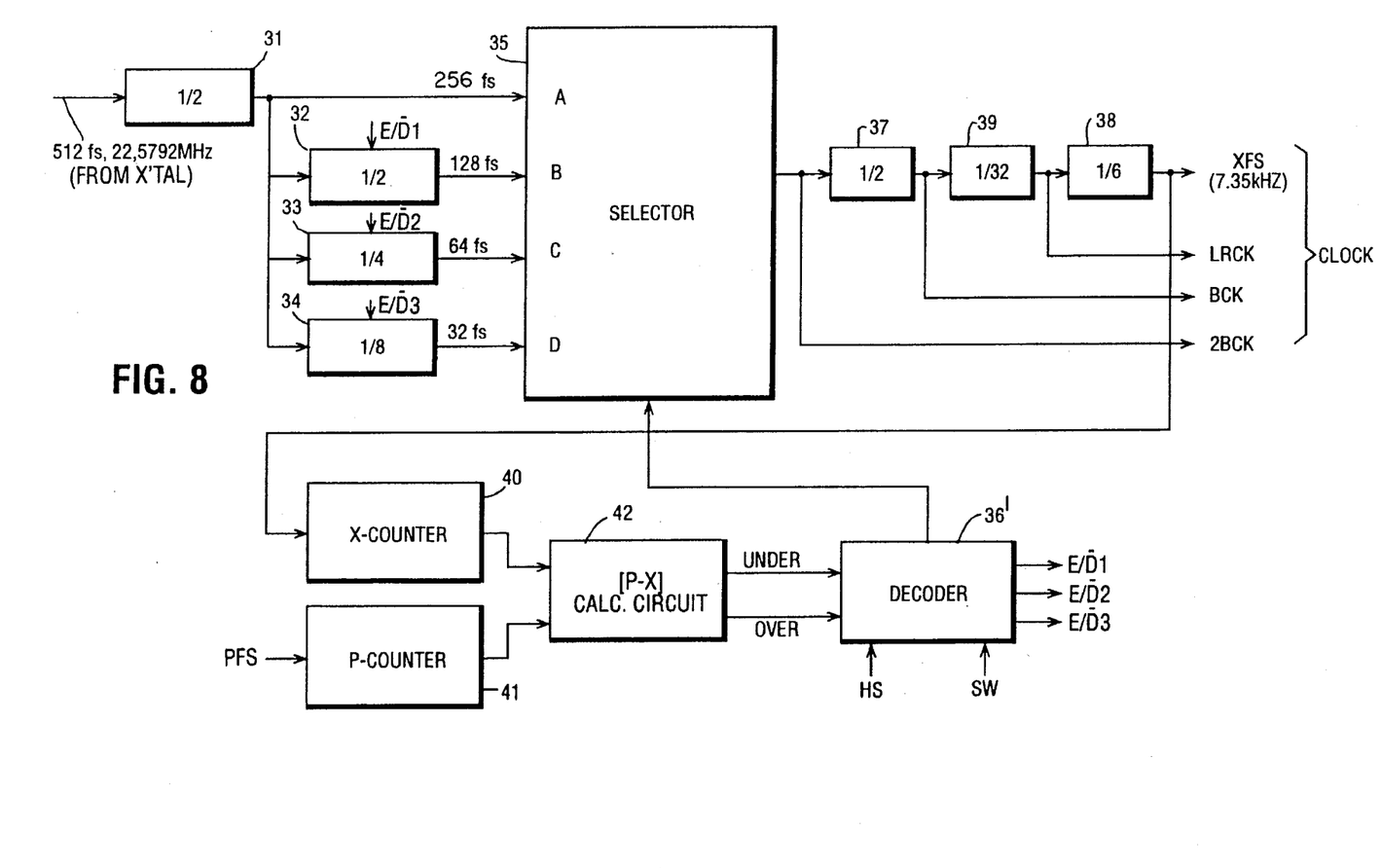
FIG. 8 is a block diagram of a clock generating circuit of a second aspect according to the present invention.
Figure 9:
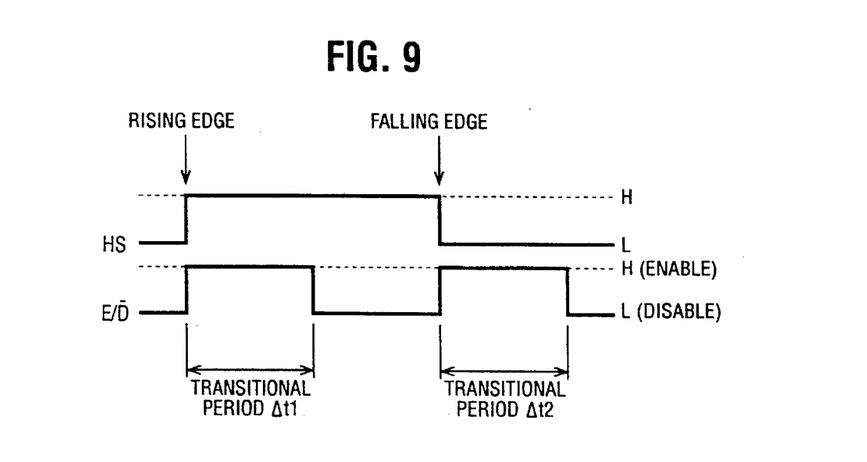
FIG. 9 is a timing chart representing the relationship between rate control signal(HS) and activating signal(E/D)

As shown in FIG. 8, each dividing circuit 32–34 has a control input, or an activating input, and an activating signal(E/D1–3; E for enable and D for disable) is supplied to this input, respectively. When the activating signal represents "enable", a source voltage is supplied to the dividing circuit corresponding to the activating signal so as to make the corresponding circuit operate.

Such activating signals(E/D1–3) are generated by a decoder 36'. The decoder 36' is usually generating "L"(low level) signal representing "disable", but by detecting edge(rising edge/falling edge) of the provided reproduction rate control signal(HS), generates an "H"(high level) signal representing "enable" during the predetermined period($\Delta$ t1, $\Delta$ t2). This relationship between the signal HS and E/D is shown in FIG 9. The predetermined period($\Delta$ t1, $\Delta$ t2) is, for example, determined in accordance with the transitional period which depends on operation of the disc motor 2. The transition period $\Delta$ t1 and $\Delta$ t2 may have different values, if the transitional period changing from the normal rate to the double and the transitional period in changing from the double to the normal is different. As described above, by changing each activating signal in accordance with outputs of the decoder 36', only the required divided clock signal is obtained.

In this case, to obtain a stable divided clock, activating a dividing circuit before its divided clock is required, is effective. To implement this technique, a required divided clock is predicted by using the differential value of [P-X] (i.e., [P-X]').

Figure 10:
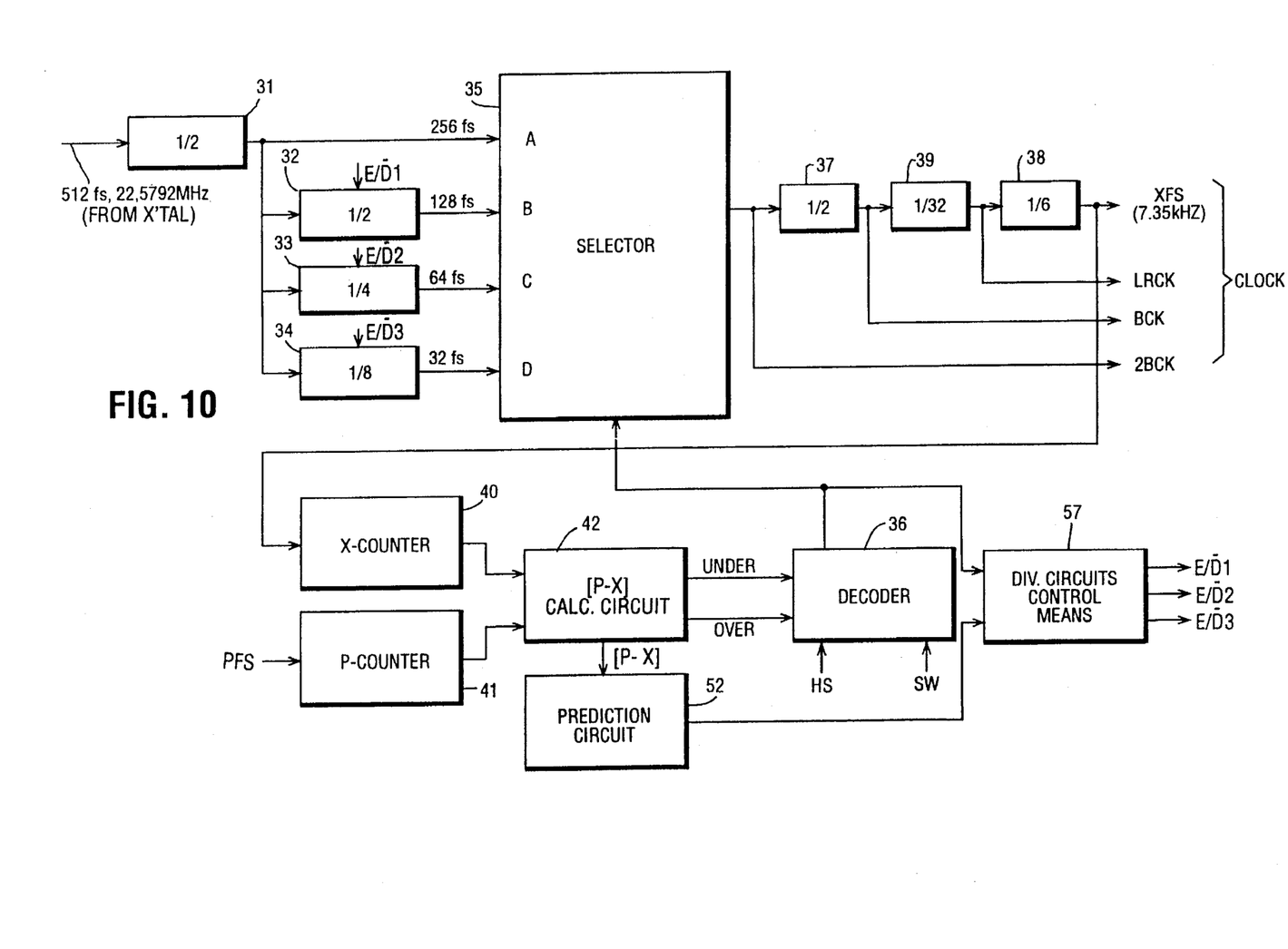
FIG. 10 is a block diagram of a clock generating circuit of a third aspect according to the present invention.

In FIG. 10, a clock generating circuit which includes the dividing circuit using a prediction technique is shown. The same elements as shown in FIG. 4 are numbered by the same numbers. The [P-X] calculating circuit supplies a prediction circuit 52 with the value [P-X]. This prediction circuit 52 includes a [P-X]' calculating circuit(not shown) and predicts a dividing circuit which will be required fop the next timing. A dividing circuits control means 51 is supplied with the prediction result and the output of the decoder 36. Then, the dividing circuits control means 51 outputs activating signals(E/D1–3) to the dividing circuits(32–34) for activating the dividing circuit which is required at present and for activating the dividing circuit which will be required next.

While, in the clock generating circuits shown in FIG. 4 and FIG. 10, the number of dividing circuits controlled by the activating signals is three, but the number of the dividing circuits may be increased to reduce the capacity of the buffer memory by strict clock control.

As described above, according to the present invention, the reading-out clock for the buffer memory 22 is changed in the transition period caused by the reproduction rate switching and large movement of the pickup. Thus, the overflow and underflow do not occur, the interruption of the data reproduction is very short, and the reproduction data is available before the disc motor reaches the required speed.

While there has been illustrated and described what are present considered to be preferred embodiments of the present invention, it will be understood by those skilled in the art that various changes and modifications may be made, and equivalents may be substituted for devices thereof without departing from the true scope of the invention. In addition many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling, within the scope of the appended claims.

What is claimed is:

1. An apparatus for reproducing information data stored on a disc comprising:

means for reading out information data from a rotating disc on which the information data is stored;

means for generating a digitized signal by quantizing the read out information data in accordance with a rotation of the disc;

means for generating a first clock signal synchronous with the digitized signal;

means for demodulating the digitized signal in synchronism with the first clock signal and for outputting a demodulated data;

means for storing the demodulated data;

means for generating a second clock signal having a frequency controlled in accordance with an amount of data stored in the storing means, wherein the amount of data stored in the storing means is represented by a difference between current read and write addresses of the storing means; and means for controlling a writing operation to the storing means in synchronism with the first clock signal and for controlling a reading operation from the storing means in synchronism with the second clock signal;

wherein the second signal generating means includes first counting means for counting frames in the first clock signal as a first result, second counting means for counting frames in the second clock signal as a second result, and means for calculating a difference between the first and second results.

2. The apparatus according to claim 1 wherein the second clock generating means further includes:

a plurality of clock generating means for generating a plurality of clock signals of different frequencies; and selecting means for selecting a clock signal among the plurality of clock signals according to the difference.

3. The apparatus according to claim 2 wherein each clock generating means among the plurality of clock generating means is activated by a different activating signal.

4. The apparatus according to claim 3 further comprising switching means for changing a speed of rotating a disc motor according to a supplied control signal wherein the different activating signals are changed by detecting edges of the control signal.

5. An apparatus for reproducing a plurality of information data stored on a disc, the plurality of information data capable of being classified into at least one of a first type data and a second type data, the apparatus comprising:

means for designating information data to be read among the plurality of information data and for designating one of the first and second types of data;

pickup means for reading information data designated by the designating means;

means for generating a first clock signal synchronous with the information data read from the disc;

means for generating a second clock signal derived from constant clock signal;

storing means for storing information data read from the disc; and control means for controlling an operation of writing the information data read from the disc to the storing means in synchronism with the first clock signal and for controlling a reading operation from the storing means in synchronism with a second clock signal;

wherein, when the designated information data is the first type data, the second clock signal is derived with a frequency according to an amount of information data stored in the storing means, and when the designated information data is the second type data, the second clock signal is derived with a frequency independent of the amount of data stored in the storing means.

6. The apparatus according to claim 5 wherein the first type data includes ROM data and the second type data includes audio data.

7. A signal processing circuit for use in processing in processing information data read from a disc, comprising:

a first clock circuit for generating a first clock signal synchronous with a digitized signal generated by quantizing the information data in accordance with a rotation of the disc;

a demodulator for demodulating the digitized signal in synchronism with the first clock signal and to output a demodulated data;

a second clock circuit for generating a second clock signal derived from a constant clock signal, the second clock circuit comprising a plurality of clock generating means for generating a plurality of clock signals of different frequencies from the constant clock signal, and selecting means for selecting the second clock signal from the plurality of generated clock signals;

a buffer memory for storing the demodulated data: and a control circuit for controlling a writing operation to the buffer memory in accordance with the first clock signal and a reading operation from the buffer memory in accordance with the second clock signal, wherein the second clock signal is selected in accordance with an amount of data stored in the buffer memory.

8. The signal processing circuit according to claim 7 wherein the amount of data stored in the buffer memory is represented by a difference between a writing address for the buffer memory and a reading address for the buffer memory.

9. A method for reproducing information data stored on a disc comprising:

reading out information data from a rotating disc on which the information data is stored:

generating a digitized signal by quantizing the information data in accordance with a rotation of the disc:

generating a first clock signal synchronous with the digitized signal;

demodulating the digitized signal in synchronism with the first clock signal and outputting demodulated data;

generating a plurality of second clock signals having different frequencies;

storing the demodulated data in synchronism with the first clock signal to a memory;

selecting one of the plurality of generated second clock signals;

reading the demodulated data stored in the memory in synchronism with the selected second clock signal; and changing the selection of the one of the plurality of generated second clock signals in accordance with an amount of the demodulated data stored in the memory.

10. An apparatus for reproducing information data stored on a disc comprising:

an optical pickup for reading out information data from a rotating disc on which the information data is stored;

a digitized signal generator for generating a digitized signal by quantizing the read out information data in accordance with a rotation of the disc;

a first clock signal generator for generating a first clock signal synchronous with the digitized signal;

a demodulator for demodulating the digitized signal in synchronism with the first clock signal and to output a demodulated data;

a buffer memory for storing the demodulated data;

a second clock signal generator for generating a second clock signal from a constant clock, the second clock signal having a frequency controlled in accordance with an amount of data stored in the buffer memory, the second clock signal generator including a plurality of clock dividers for generating a plurality of divided clock signals of different frequencies and a selector for selecting one of the divided clock signals as the second clock signal according to the amount of data; and a controller for controlling a writing operation to the buffer memory in synchronism with the first clock signal and to control a reading operation from the buffer memory in synchronism with the second clock signal.

11. A signal processing circuit for use in processing information data read from a disc, comprising:

a first clock circuit for generating a first clock signal synchronous with a digitized signal generated by quantizing the information data in accordance with a rotation of the disc;

a demodulator for demodulating the digitized signal in synchronism with the first clock signal and to output a demodulated data;

a second clock circuit for generating a second clock signal from a constant clock signal, the second clock signal including a plurality of clock dividers for generating a plurality of divided clock signals of different frequencies and a selector for selecting one of the divided clock signals as the second clock signal;

a buffer memory for storing the demodulated data; and a control circuit for controlling a writing operation to the buffer memory in accordance with the first clock signal and to control a reading operation from the buffer memory in accordance with the second clock signal, wherein the selector selects the one of the divided clock signals as the second clock signal based on an amount of data stored in the buffer memory so that a frequency of the second clock signal is controlled in accordance with the amount of data stored in the buffer memory.

12. A signal processing circuit for use in reproducing designated information data to be read from a plurality of information data stored on a disc, the plurality of information data capable of being classified into at least one of a first type data and a second type data, the signal processing circuit comprising:

a first clock circuit for generating a first clock signal synchronous with the designated information data read from the disc;

a second clock circuit for generating a second clock signal derived from a constant clock signal;

a buffer memory for storing the designated information data read from the disc; and a control circuit for controlling writing the designated information data read from the disc to the buffer memory in synchronism with the first clock signal and to control a reading operation from the buffer memory in synchronism with the second clock signal, wherein when the designated information data is the first type data, the second clock signal is derived with a frequency according to an amount of the first type data stored in the buffer memory, and when the designated information data is the second type data, the second clock signal is derived with a frequency independent of an amount of the second type data stored in the buffer memory.

13. A signal processing circuit according to claim 12, wherein the second clock circuit includes a plurality of clock dividers for generating a plurality of clock signals of different frequencies and a selector to select one of the divided clock signals as the second clock signal.

* * * * *

UNITED STATES PATENT AND TRADEMARK OFFICE
CERTIFICATE OF CORRECTION

PATENT NO. : 5,553,041
DATED : September 03, 1996
INVENTOR(S) : Jun INAGAWA et al.

It is certified that error appears in the above-indentified patent and that said Letters Patent is hereby corrected as shown below:

Claim 1, column 10, line 49, "second signal" should read --second clock signal--.

Claim 5, column 11, line 15, before "constant", insert --a--.

Claim 7, column 11, lines 33-34, after "in processing", delete "in processing".

Claim 9, column 11, line 65, "stored:" should read --stored;--.

Claim 9, column 11, line 67, "disc:" should read --disc;--.

Signed and Sealed this

Third Day of February, 1998

BRUCE LEHMAN

*Attest:*

*Attesting Officer*    Commissioner of Patents and Trademarks